United States Patent
Iwase

(10) Patent No.: US 8,143,323 B2
(45) Date of Patent: Mar. 27, 2012

(54) POLYURETHANE FOAM FOR VEHICLE AND METHOD FOR MANUFACTURING THE SAME

(75) Inventor: Satoshi Iwase, Aichi (JP)

(73) Assignee: Inoac Corporation, Nagoya-shi, Aichi (JP)

( * ) Notice: Subject to any disclaimer, the term of this patent is extended or adjusted under 35 U.S.C. 154(b) by 59 days.

(21) Appl. No.: 12/685,303

(22) Filed: Jan. 11, 2010

(65) Prior Publication Data

US 2010/0108434 A1 May 6, 2010

Related U.S. Application Data

(62) Division of application No. 11/946,712, filed on Nov. 28, 2007, now abandoned.

(30) Foreign Application Priority Data

Nov. 30, 2006 (JP) .................. 2006-323706

(51) Int. Cl.
*C08J 9/00* (2006.01)
*C08G 18/65* (2006.01)
*C08G 18/66* (2006.01)
*C08G 18/72* (2006.01)
*B32B 5/18* (2006.01)
*B29C 47/06* (2006.01)

(52) U.S. Cl. .......... 521/170; 521/82; 521/176; 181/204; 181/288; 156/78; 156/245

(58) Field of Classification Search .................. 521/170, 521/82, 176; 181/204, 288; 156/78, 245
See application file for complete search history.

(56) References Cited

U.S. PATENT DOCUMENTS

| | | | |
|---|---|---|---|
| 3,620,906 A | 11/1971 | Hannes | |
| 4,315,078 A | 2/1982 | Anorga | |
| 4,689,357 A * | 8/1987 | Hongu et al. | 521/176 |
| 4,968,724 A | 11/1990 | Mascioli | |
| 5,023,280 A | 6/1991 | Haas et al. | |
| 5,192,811 A | 3/1993 | Heitmann et al. | |
| 6,107,355 A * | 8/2000 | Horn et al. | 521/51 |
| 6,583,192 B2 | 6/2003 | Falke et al. | |
| 6,765,034 B2 | 7/2004 | Nishida et al. | |
| 2002/0133042 A1 | 9/2002 | Murrar et al. | |
| 2006/0025489 A1 | 2/2006 | Yano | |
| 2008/0157036 A1* | 7/2008 | Ogawa et al. | 252/608 |

FOREIGN PATENT DOCUMENTS

| | | |
|---|---|---|
| CA | 2054287 | 4/1992 |
| CA | 2059260 A1 | 7/1992 |
| EP | 0192888 A2 | 9/1986 |
| EP | 0450403 A2 | 10/1991 |
| EP | 0482507 A2 | 4/1992 |
| EP | 1630192 A2 | 3/2006 |
| JP | 2004-43747 A | 2/2004 |
| JP | 2006-63296 A | 3/2006 |
| WO | WO 2006073097 A1 * | 7/2006 |

OTHER PUBLICATIONS

Waclawska. Thermal Decomposition of Borax. J. of Thermal Analysis. 1995. pp. 261-269. vol. 43. John Wiley & Sons, Limited.

* cited by examiner

*Primary Examiner* — Michael Pepitone
(74) *Attorney, Agent, or Firm* — Marsh Fischmann & Breyfogle LLP

(57) ABSTRACT

A polyurethane foam for vehicles is obtained by reaction, foaming, and curing of a polyurethane-foam raw material comprising polyol, polyisocyanate, a blowing agent, and a catalyst, and is used for vehicle parts. The foam raw material comprises expanded graphite and an inorganic compound hydrate. The polyol preferably comprises polymeric polyol in which a polyether polyol is graft-polymerized with a vinyl monomer, polyether polyol having a mass average molecular weight of from 400 to 1,000, in which a polyhydric alcohol is addition-polymerized with an alkylene oxide, and polyether polyol having a mass average molecular weight of from 2,000 to 4,000 in which a polyhydric alcohol is addition-polymerized with an alkylene oxide.

2 Claims, No Drawings

POLYURETHANE FOAM FOR VEHICLE AND METHOD FOR MANUFACTURING THE SAME

CROSS-REFERENCE TO RELATED APPLICATIONS

This application is a divisional application of U.S. patent application Ser. No. 11/946,712 filed Nov. 28, 2007, now abandoned, which claims priority from Japanese Patent Application No. 2006-323706 filed Nov. 30, 2006. Each of these applications is hereby incorporated by reference in its entirety as if set forth herein in full.

BACKGROUND OF THE INVENTION

The present invention relates to a polyurethane foam for vehicles that is used, for example, for vehicle parts of cars such as a hood silencer or a dash silencer, is lightweight, exhibits low combustibility, and shows suppressed discoloration, and to a method for manufacturing the same.

A polyurethane foam with which a flame retardant is blended to provide low combustibility has been used for vehicle parts for cars such as interior materials. It has been desired that this polyurethane foam have an apparent density of 20 kg/m$^3$ or less in terms of weight saving. Glass fiber is used for a vehicle part such as a hood silencer formed in the inside of a hood and a dash silencer used as a partition between an engine compartment and a passenger compartment. However, although glass fiber has excellent flame retardancy, it has a high specific gravity (density) and is heavy. Therefore, a hood silencer and a dash silencer using a polyurethane foam which is lighter than glass fiber are called for. Japanese Laid-Open Patent Publication No. 2004-43747 discloses a urethane foam (polyurethane foam) containing expanded graphite and a phosphorus-based flame retardant as a material for a flame-retardant heat-insulating acoustic material.

In order to improve the fuel consumption or the like, the weight of a car is desired to be reduced. Polyurethane foam used for vehicle parts such as a hood silencer is also expected to have a lower density while maintaining the physical properties. Conventionally, it has been difficult to reduce the apparent density of polyurethane foam to 20 kg/m$^a$ or less. Specifically, in order to manufacture polyurethane foam having an open cell structure, a predetermined hardness, and a low density, it is necessary to increase the content of water as a blowing agent in a raw material of the polyurethane foam. In this case, the increase in the content of water causes an increase in the exothermic temperature of the raw material to 170° C. or higher. As a result, there is a possibility of self-ignition based on oxidation deterioration (scorching) of polyurethane, and the resulting polyurethane foam is discolored according to the scorching. In order to avoid such a situation, it is known that a blowing auxiliary is added to the raw material with the conventional content of water. As a blowing auxiliary, methylene chloride and liquefied carbon dioxide may be used.

However, methylene chloride is one of the substances that have an adverse influence on environment, and its use is regulated. On the other hand, foaming with liquefied carbon dioxide requires equipment exclusive for supplying liquefied carbon dioxide at a high pressure, and in order to perform foaming smoothly, not only manufacturing conditions are limited but also manufacturing costs are increased. Japanese Laid-Open Patent Publication No. 2006-63296 discloses a technique in which an inorganic compound hydrate is added to a polyurethane-foam raw material for the purpose of endotherm. As the inorganic compound hydrate, for example, iron sulfate hydrate may be used.

However, in order to reduce the density of the polyurethane foam disclosed in Japanese Laid-Open Patent Publication No. 2004-43747, it is necessary to increase the content of water as a blowing agent. As mentioned above, this promoted foam-forming reaction of a raw material increases the exothermic temperature of the raw material, and, as a result, discoloration occurs in the foam due to scorching. The polyurethane foam disclosed in Japanese Laid-Open Patent Publication No. 2006-63296 has an effect in the reduction of the exothermic temperature at the time of reaction and foaming of a raw material. However, since a flame retardant is not blended with the foam raw material, there is a problem that the resulting polyurethane foam does not suppress the combustibility. Therefore, a polyurethane foam for vehicles that exhibits low combustibility and suppression of discoloration with sufficient balance has been desired.

SUMMARY OF THE INVENTION

It is an objective of the present invention to provide a polyurethane foam for vehicles that exhibits a low combustibility, particularly a low combustibility after heat aging or hygrothermal aging and shows suppressed discoloration, and to provide a method for manufacturing the same.

In order to achieve the foregoing objective, and in accordance with a first aspect of the present invention, a polyurethane foam for vehicles that is obtained by reaction, foaming, and curing of a polyurethane-foam raw material comprising polyol, polyisocyanate, a blowing agent, and a catalyst is provided. The polyurethane foam is used for vehicle parts. The polyurethane-foam raw material includes expanded graphite and an inorganic compound hydrate.

In accordance with a second aspect of the present invention, a method for manufacturing a polyurethane foam used for vehicle parts is provided. The method includes: preparing a polyurethane-foam raw material comprising polyol, polyisocyanate, a blowing agent, a catalyst, expanded graphite, and an inorganic compound hydrate; and producing a polyurethane foam by reaction, foaming, and curing of the raw material.

DETAILED DESCRIPTION OF THE PREFERRED EMBODIMENTS

Hereafter, an embodiment of the present invention will be described in detail. A polyurethane foam for vehicles in the present embodiment is obtained by reaction, foaming, and curing of a polyurethane-foam raw material comprising polyol, polyisocyanate, a blowing agent, and a catalyst and is used for vehicle parts. In the following description, the polyurethane foam for vehicles is referred to only as a foam. The foam raw material further comprises expanded graphite and an inorganic compound hydrate. Expanded graphite allows the foam to exhibit low combustibility (flame retardancy), particularly low combustibility after heat aging or hygrothermal aging. The inorganic compound hydrate suppresses discoloration of the foam. The polyurethane obtained by urethane-foaming reaction of polyol and polyisocyanate is mainly composed of a hard segment based on a urethane linkage and a soft segment based on, for example, a polyether linkage. The hard segment develops specific physical properties, for example, hardness and rigidity, and the soft segment develops other physical properties, for example, flexibility and elasticity.

The polyol includes, for example, polyether polyol, polyester polyol, and polymeric polyol. In the present embodiment, these listed polyols and the polyols discussed below may be contained alone or in a combination of two kinds or more. The polyether polyol includes, for example, polyether polyol composed of a polymer in which a polyhydric alcohol is addition-polymerized with an alkylene oxide and a modified product thereof. The polyhydric alcohol includes, for example, polypropylene glycol, polytetramethylene glycol, dipropylene glycol, glycerin, and trimethylolpropane. The alkylene oxide includes, for example, propylene oxide and ethylene oxide. Specific examples of the polyether polyol include, for example, a triol in which glycerin is addition-polymerized with propylene oxide and further addition-polymerized with ethylene oxide, and a diol in which dipropylene glycol is addition-polymerized with propylene oxide and further addition-polymerized with ethylene oxide.

The polyester polyol includes, for example, condensed polyester polyol obtained by reacting polycarboxylic acid with polyol, lactone polyester polyol, and polycarbonate polyol. The polycarboxylic acid includes, for example, adipic acid and phthalic acid. The polyol includes, for example, ethylene glycol, diethylene glycol, propylene glycol, and glycerol. The polyether polyol is preferred because it has higher reactivity with polyisocyanate than polyester polyol and is not hydrolyzed.

The polymeric polyol is obtained by graft polymerization of a vinyl monomer to the above polyether polyol in accordance with a conventional method. The polymeric polyol enhances the hardness and moldability (heating moldability) of the foam because the grafted portion thereof reinforces the foam, and the polyether polyol increases the crosslinking density of the foam to increases the hard segment. The vinyl monomer includes, for example, acrylonitrile, styrene, and methyl methacrylate. The content of the vinyl monomer in the polymeric polyol, that is, the content of the vinyl monomer unit (grafted portion) in the polymeric polyol is preferably 10 to 40% by mass, more preferably 15 to 30% by mass, based on the total amount of polyether polyol units and vinyl monomer units. When the content of the vinyl monomer is less than 10% by mass, there is a possibility that the grafted portion in the polymeric polyol may be insufficient, and the functional expression of this grafted portion may become insufficient. When the content of the vinyl monomer exceeds 40% by mass, there is a possibility that the grafted portion may become excessive and the foam may become excessively hard. In the polymeric polyol, the grafted portion is solid due to crystallization.

The mass average molecular weight of the polymeric polyol is preferably from 3,000 to 6,000. When the mass average molecular weight of the polymeric polyol is less than 3,000, the effect of the grafted portion is not sufficiently developed, and it becomes difficult to increase the physical properties, for example, hardness of the foam. When the mass average molecular weight of the polymeric polyol exceeds 6,000, the hardness of the foam tends to become excessively high.

In order to increase the crosslinking density of the foam to thereby improve the mechanical properties of the foam, the polyol preferably comprises the polymeric polyol and low molecular weight polyether polyol. The low molecular weight polyether polyol means polyether polyol having a mass average molecular weight of from 400 to 1,000 in which a polyhydric alcohol is addition-polymerized with an alkylene oxide. This low molecular weight polyether polyol is obtained by the same manufacturing method using the same raw material as the above polyether polyol. The low molecular weight polyether polyol includes, for example, a triol in which glycerin is addition-polymerized with propylene oxide, a triol in which the triol is further addition-polymerized with ethylene oxide, a diol in which dipropylene glycol is addition-polymerized with propylene oxide, polypropylene glycol, and polytetramethylene glycol.

For the addition polymerization of ethylene oxide, the content of ethylene oxide in the raw material of the low molecular weight polyether polyol is about 5 to 15% by mol. A higher content of the ethylene oxide unit enhances hydrophilicity of the low molecular weight polyether polyol to improve the mixability with highly polar molecules, for example, polyisocyanate, to thereby enhance reactivity. When the mass average molecular weight of the low molecular weight polyether polyol is less than 400, the foam will have an excessively high crosslinking density and an increased hard-segment content, and thereby the foam will have excessively high hardness. When the mass average molecular weight of the low molecular weight polyether polyol exceeds 1,000, the effect of the low molecular weight polyether polyol will not sufficiently demonstrated, the foam tends to become soft.

The content of the polymeric polyol based on the total amount of the above low molecular weight polyether polyol and the polymeric polyol is preferably 40 to 75% by mass.

Therefore, the content of the low molecular weight polyether polyol based on the total amount of the low molecular weight polyether polyol and the polymeric polyol is preferably 25 to 60% by mass. When the content of the polymeric polyol is less than 40% by mass, and when the content of the low molecular weight polyether polyol exceeds 60% by mass, the crosslinking density of the foam will be excessively high and an open cell structure will not be sufficiently formed, and there is a possibility that the function of the polymeric polyol may not be sufficiently exhibited. When the content of the polymeric polyol exceeds 75% by mass, and when the content of the low molecular weight polyether polyol is less than 25% by mass, the crosslinking density of the foam will be too low, and the hardness of this foam tends to be reduced.

In order to improve the flexibility of the foam, the polyol preferably further comprises high molecular weight polyether polyol in addition to the polymeric polyol and the low molecular weight polyether polyol. The high molecular weight polyether polyol means polyether polyol having a mass average molecular weight of from 2,000 to 4,000 in which a polyhydric alcohol is addition-polymerized with an alkylene oxide. Reaction of the high molecular weight polyether polyol with the polyisocyanate increases the rate of the soft segment of the foam. When the mass average molecular weight of the high molecular weight polyether polyol is less than 2,000, the crosslinking density of the foam will be increased, and there is a possibility that the effect of blending the high molecular weight polyether polyol may be reduced. When the mass average molecular weight of the high molecular weight polyether polyol exceeds 4,000, there is a possibility that the flexibility of the foam may be increased.

The content of the high molecular weight polyether polyol based on the total amount of the above polymeric polyol, low molecular weight polyether polyol, and high molecular weight polyether polyol is preferably 50% by mass or less. When the content of the high molecular weight polyether polyol exceeds 50% by mass, the flexibility of the foam will be excessively high, and it will be difficult to obtain a target foam.

The above polyether polyol may be polyether ester polyol. The polyether ester polyol is obtained by allowing a polyoxyalkylene polyol to react with a polycarboxylic anhydride and a compound having a cyclic ether group. The polyoxyalkylene polyol includes, for example, polyethylene glycol, polypropylene glycol, and a propylene oxide adduct of glycerin. The polycarboxylic anhydride includes, for example, succinic anhydride, adipic anhydride, and phthalic anhydride. The compound having a cyclic ether group includes, for example, ethylene oxide and propylene oxide.

The number of functional groups of hydroxyl group and hydroxyl value in the polyol may be varied by adjusting, for example, the ingredient type, molecular weight, or condensation degree of the raw material components of the polyol. In order to increase the crosslinking density of the foam to thereby improve physical properties, for example, the hardness thereof, the foam raw material preferably comprises a crosslinking agent having three hydroxyl groups per molecule. The crosslinking agent reacts with polyisocyanate to form a crosslinking structure in the foam. The crosslinking agent includes, for example, glycerin and trimethylolpropane.

The polyisocyanate that reacts with the polyol is a compound having a plurality of isocyanate groups. The polyisocyanate includes, for example, tolylene diisocyanate (TDI), 4,4-diphenylmethane diisocyanate (MDT), 1,5-naphthalene diisocyanate (NDI), triphenylmethane triisocyanate, xylylene diisocyanate (XDI), hexamethylene diisocyanate (HDI), dicyclohexylmethane diisocyanate, isophorone diisocyanate (IPDI), and modified products thereof. These polyisocyanates may be contained alone or in a combination of two kinds or more.

An isocyanate index of the polyisocyanate may be 100 or less or may exceed 100, but it is preferably from 80 to 110. When the isocyanate index is less than 80, the content of the polyisocyanate is too small to obtain a foam having favorable mechanical properties, for example, favorable hardness. When the isocyanate index exceeds 110, the exothermic temperature at the time of foaming will increase, and there is a possibility that the flexibility of the foam may be reduced. The isocyanate index is an equivalent ratio of an isocyanate group of the polyisocyanate to the total of a hydroxyl group of polyol, a hydroxyl group of the crosslinking agent, and an active hydrogen group of the blowing agent such as water, expressed by percentage. The isocyanate index of more than 100 means that the polyisocyanate is excessive in comparison with the polyol and the like.

The blowing agent causes foaming of a polyurethane resin to thereby form the foam. The blowing agent includes, for example, water, pentane, cyclopentane, hexane, cyclohexane, dichloromethane, methylene chloride, and carbon dioxide gas. These specific examples may be contained alone or in a combination of two kinds or more. Water is preferred as a blowing agent because water has high reactivity in the foam-forming reaction and is easy in handling. When the blowing agent is water, the content of water in the raw material is preferably from 5 to 15 parts by mass based on 100 parts by mass of the polyol, in order to obtain an apparent density of the foam as low as 15 to 20 kg/m. When the content of water is less than 5 parts by mass, the amount of foaming is small and there is a tendency that the apparent density of the foam exceeds 20 kg/m$^3$. Therefore, it is difficult to reduce the density of the foam. When the content of water exceeds 15 parts by mass, the temperature of the raw material will rise easily at the time of reaction and foaming, and it will become difficult to reduce this temperature.

The catalyst promotes, for example, the urethane-foaming reaction of the polyol with the polyisocyanate and the foam-forming reaction of the polyisocyanate with water as the blowing agent. The catalyst includes, for example, a tertiary amine, an organometallic compound, an acetate, and an alkali metal alcoholate. The tertiary amine includes, for example, triethylenediamine, dimethylethanolamine and N,N',N'-trimethyl aminoethyl piperazine. The organometallic compound includes, for example, tin octylate (tin octoate) and dibutyltin dilaurate. These specific examples may be contained alone or in a combination of two kinds or more.

In order to enhance the effect of a catalyst, the raw material preferably contains a combination of the tertiary amine and the organometallic compound as the catalyst. The content of the tertiary amine in the raw material is preferably from 0.01 to 0.5 part by mass per 100 parts by mass of the polyol. When the content of the tertiary amine is less than 0.01 part by mass, there is a possibility that the urethane-forming reaction and foam-forming reaction cannot be promoted satisfactorily with sufficient balance. When the content of the tertiary amine exceeds 0.5 part by mass, there is a possibility that the urethane-forming reaction and foam-forming reaction are excessively promoted or the content results in loss of the balance between these reactions. The content of the organometallic compound in the raw material is preferably from 0.1 to 0.5 part by mass per 100 parts by mass of the polyol. When the content of the organometallic compound is less than 0.1 part by mass, there is a possibility that the balance between the urethane-forming reaction and the foam-forming reaction is lost, and the foaming cannot be performed well. When the content of the organometallic compound exceeds 0.5 part by mass, the urethane-forming reaction and foaming reaction will be excessively promoted and the balance between these reactions will be lost, and there is a possibility that the compression set of the foam may be reduced.

Low combustibility is required of the foam because the foam is used for vehicle parts such as a hood silencer and a dash silencer. For this reason, expanded graphite as a flame retardant is contained in the foam raw material. A chemical substance is inserted (intercalation) between the layers of flake graphite to form expanded graphite. The chemical substance to be intercalated includes, for example, nitric acid, potassium permanganate, and sulfuric acid. Among these, sulfuric acid is preferred because expansion starting temperature is high. The average particle diameter of expanded graphite is preferably from 45 to 500 µm. The expansion starting temperature is preferably from 180 to 200° C. The volume of expansion is, for example, from 100 to 300 ml/g. This expanded graphite is expanded by heating at the time of combustion due to generation of a gas from the chemical substance to form a solid phase having flame retardancy, thereby developing low combustibility.

The foam obtained from the raw material containing the expanded graphite can meet the acceptance standard of the combustion test based on the Federal Motor Vehicle Safety Standards, and can also meet the acceptance standard of the combustion test after a heat aging test and the combustion test after a hygrothermal aging test. The content of the expanded graphite in the raw material is preferably from 5 to 50 parts by mass per 100 parts by mass of the polyol. When the content of the expanded graphite is less than 5 parts by mass, sufficient low combustibility tends not to be provided to the foam. When the content of the expanded graphite exceeds 50 parts by mass, there will be a tendency for the excessive expanded graphite to prevent the foaming, thus making it difficult to obtain a favorable foam.

Besides the above expanded graphite, a flame retardant generally known may be blended with the raw material in accordance with a conventional method. Known flame retardants include, for example, a phosphorus-based flame retardant, a halogen-based flame retardant, and an inorganic flame retardant. Specific examples of these flame retardants include, for example, oxydi-2,1-ethanediyl tetrakis (2-chloro-1-methylethyl) phosphate (halogen-containing flame retardant), phosphoric ester (non-halogen flame retardant), and tetrabromobisphenol A.

The above-described inorganic compound hydrate decomposes upon heating and generates water by the decomposition. The inorganic compound hydrate reduces the exothermic temperature of the reaction mixture at the time of the reaction of the raw material by the latent heat of vaporization of water produced by the dissociation thereof. In addition, it reduces the density of the foam and suppresses discoloration of the foam by the increase in the amount of water as a blowing agent. The inorganic compound hydrate includes, for example, calcium sulfate dihydrate [$CaSO_4.2H_2O$, alias: gypsum dihydrate, specific gravity 2.32, decomposition temperature 128 to 163° C. (from $-1.5H_2O$ to $-2.0H_2O$)], magnesium sulfate heptahydrate [$MgSO_4.7H_2O$, specific gravity 1.68, decomposition temperature 150° C. ($-6H_2O$)], magnesium phosphate octahydrate [$(Mg)_3(PO_4)_2.8H_2O$, specific gravity 2.41, decomposition temperature 120° C. ($-5H_2O$)], iron sulfate monohydrate to iron sulfate pentahydrate (from $FeSO_4.H_2O$ to $FeSO_4.5H_2O$, specific gravity 2.97, decomposition temperature 100 to 130° C.), and mixtures thereof.

The water of hydration contained in the inorganic compound hydrate is water of crystallization, and is present stably as a solid crystal at the ordinary temperature (25° C.). The inorganic compound hydrate preferably includes a calcium sulfate hydrate, a magnesium sulfate hydrate, and a magnesium phosphate hydrate. This is because these hydrates can gradually dissociate (decompose) at 100° C. or above along the foaming process of the foam raw material to produce water, thus capable of developing the endothermic action based on the latent heat of vaporization.

The specific gravity of the inorganic compound hydrate is preferably from 1.5 to 3.0. When the specific gravity of the inorganic compound hydrate is less than 1.5, it is necessary to add a large volume of the inorganic compound hydrate, which is powder, to the foam raw material, for example, the polyol in order to add a predetermined mass of the inorganic compound hydrate. Therefore, there is a possibility that the inorganic compound hydrate, which is a power, and polyol cannot sufficiently be mixed and stirred. There is also a possibility that the volume of the inorganic compound hydrate occupied in the foam may be increased to thereby reduce the physical properties of the foam. When the specific gravity of the inorganic compound hydrate exceeds 3.0, the inorganic compound hydrate will sediment easily in the foam raw material, particularly in the polyol during prolonged storage thereof, and the dispersibility into the reaction mixture will be reduced. As a result, there is a possibility that the function of the inorganic compound hydrate to reduce the exothermic temperature of the reaction mixture at the time of the reaction of the raw material may be reduced.

The decomposition temperature of the inorganic compound hydrate is preferably from 100 to 170° C. When the decomposition temperature is less than 100° C., water due to the decomposition is produced in the early stage of the foaming and curing of the foam raw material, that is, in the stage where exothermic temperature is low. Therefore, there is a possibility that it may have an adverse influence on the foaming and curing of the raw material, or the produced water may function as a blowing agent. Calcium sulfate dihydrate (gypsum dihydrate) loses water at 128° C. to form calcium sulfate hemihydrate (gypsum hemihydrate), wherein 1.5 mol of water in 2 mol of water in the molecule decompose to form free water. Magnesium sulfate heptahydrate loses water at 150° C. to form magnesium sulfate monohydrate, wherein 6 mol of water in 7 mol of water in the molecule decompose to form free water.

The content of the inorganic compound hydrate in the raw material is preferably from 10 to 80 parts by mass, more preferably from 10 to 50 parts by mass, per 100 parts by mass of the polyol. When the content of the inorganic compound hydrate is less than 10 parts by mass, the amount of the water produced by the decomposition, is small, and the increase of the exothermic temperature of the reaction mixture based on the reaction and foaming of the raw material cannot sufficiently be suppressed. When the content of the inorganic compound hydrate exceeds 80 parts by mass, there is a possibility of causing reduction in physical properties, for example, hardness and moldability of the foam.

The foam raw material preferably contains a foam stabilizer in order to perform the foaming smoothly. As the foam stabilizer of this invention, a generally used foam stabilizer for producing a foam is available. Specific examples of the foam stabilizer include, for example, a silicone compound, an anionic surfactant, polyether siloxane, and a phenolic compound. The anionic surfactant includes, for example, sodium dodecylbenzenesulfonate and sodium lauryl sulfate. The content of the foam stabilizer in the raw material is preferably from 0.5 to 2.5 parts by mass per 100 parts by mass of the polyol. When the content of the foam stabilizer is less than 0.5 part by mass, the foam-stabilizing effect at the time of foaming of the foam raw material is not sufficiently developed, but it becomes difficult to obtain a favorable foam. When the content of the foam stabilizer exceeds 2.5 parts by mass, the form-stabilizing effect becomes strong, and the free passage properties of cells tend to be reduced.

The foam raw material contains a filler, a stabilizer, a colorant, and a plasticizer other than the above components if needed. And the foam is produced by reaction, foaming, and curing of the raw material. Although the reaction for producing the foam is complicated, typically, production of the foam mainly involves the following reactions.

Specifically, they are an addition-polymerization reaction (urethane-forming reaction, resinification reaction) of polyol with polyisocyanate, a foam-forming (foaming) reaction of polyisocyanate with the blowing agent, for example, water, and a crosslinking (curing) reaction of the resulting products of these reactions with polyisocyanate. In the production of the foam, a one-shot process or a prepolymer technique is adopted. The one-shot process is a process for directly reacting polyol with polyisocyanate. The prepolymer technique is a technique, for example, of reacting the total amount of one of the polyol and the polyisocyanate with a part of the other beforehand to obtain a prepolymer having as isocyanate group in a terminal, and then reacting the product with the rest or the other. Moreover, the foam may be a slab foam obtained by foaming and curing the raw material under ordinary temperature and atmospheric pressure (0.1 MPa), or a mold foam obtained by pouring a foam raw material (reaction mixture) into a mold followed by mold clamping, and then foaming and curing the raw material within the mold. The slab foam is preferred because it can be produced continuously.

The foam thus obtained has an apparent density based on JIS K 7222: 1999 which is Japanese Industrial Standards (ISO 845 which is international standards) of, for example, 15 to 20 $kg/m^3$. Moreover, the foam has a hardness based on JIS K 6400-2: 2004 (ISO 2439) of, for example, 6 to 21 kPa. Thus, the foam is a flexible polyurethane foam having a low density, favorable cushioning properties, and a light weight. The flexible polyurethane foam is a foam that has a light weight, generally has an open-cell (air bubble) structure, has flexibility and elasticity, and has recovery properties. The foam can pass the combustion test based on the Federal Motor Vehicle Safety Standards, and can also pass a still severer combustion test after heat aging test and combustion test after hygrothermal aging test. In addition, the foam has favorable moldability and can also suppress discoloration (yellow index, ΔYI value) to 1.0 or less. Therefore, the foam is suitably used for vehicle parts, for example, a hood silencer provided in the surroundings of the engine of a car and a dash silencer used as a partition between an engine compartment and a passenger compartment.

Particularly, a hood silencer is a laminate produced by gluing a cover material with an adhesive on a substrate composed of the foam. In the manufacturing process of this laminate, an adhesive is first applied to the surface of a substrate, and then a cover material is laminated on the adhesive. Subsequently, the laminate is heated and pressurized with a hot press molding machine for a predetermined period of time, compressed and shaped into a predetermined shape, and then demolded. Therefore, it is desirable for the above foam constituting the laminate to have favorable moldability and low discoloration.

According to the present embodiment, the foam is produced by reaction, foaming, and curing of the above foam raw material through a common procedure. The foam raw material contains expanded graphite. Therefore, expanded graphite is heated at the time of combustion of the foam, and an intercalated chemical substance generates a gas and expands to form a solid phase having flame retardancy. It is assumed that the combustion of the foam is suppressed by the solid phase. Moreover, the foam raw material contains the inorganic compound hydrate. Therefore, the inorganic compound hydrate dissociates with an increase in temperature at the time of the reaction of the raw material and the foaming to thereby produce water, and the water evaporates. By the evaporation of the water, the latent heat of vaporization is carried away, and the increase in temperature of the reaction mixture at the time of the reaction of the raw material is suppressed. Furthermore, the amount of the water as the blowing agent can be increased, and reduction in density can be achieved while suppressing discoloration of the foam.

The present embodiment has the following advantages.

In the foam according to the present embodiment, expanded graphite and the inorganic compound hydrate are contained in the foam raw material. Therefore, by the low combustion effect based on the expanded graphite and the endothermic action based on the inorganic compound hydrate, the foam can have low density and can exhibit low combustibility, particularly low combustibility after heat aging or hygrothermal aging, and discoloration of the foam is suppressed. Therefore, the foam can be suitably used for vehicle parts in which low combustibility is especially required.

The polyol preferably comprises polymeric polyol and the above-described low molecular weight polyether polyol. In this case, when the polymeric polyol reacts with the polyisocyanate, the graft portion reinforces the foam by its crystallinity. Furthermore, the low molecular weight polyether polyol reacts with the polyisocyanate to increase the crosslinking density of the foam and increases the hard segment. Therefore, the hardness and moldability of the foam are improved.

The polyol preferably further comprises the above-described high molecular weight polyether polyol. In this case, the high molecular weight polyether polyol reacts with the polyisocyanate to increase the rate of the soft segment. Therefore, the flexibility of the foam can be improved.

The foam raw material preferably further comprises the crosslinking agent having three hydroxyl groups per molecule. In this case, the crosslinking density of the foam can be increased and the physical properties, for example, hardness of the foam can be improved.

The foam can be suitably used for a hood silencer or a dash silencer as vehicle parts and can demonstrate the above-described effect most effectively in those vehicle parts.

The content of the expanded graphite in the raw material is preferably from 10 to 50 parts by mass per 100 parts by mass of the polyol. In this case, the foam demonstrates excellent low-combustibility without interfering with the foaming of the raw material.

The inorganic compound hydrate is preferably a hydrate of sulfate or phosphate. In this case, the hydrate of sulfate or phosphate is decomposed with the foaming process of the foam raw material to produce water, thus adequately demonstrating the endothermic action.

The content of the inorganic compound hydrate in the raw material is preferably from 10 to 50 parts by mass per 100 parts by mass of the polyol. In this case, the endothermic action is adequately demonstrated without interfering with the foaming of the raw material and without affecting the physical properties of the foam.

Preferably, the blowing agent is water, and the content of water in the raw material is from 5 to 15 parts by mass per 100 parts by mass of the polyol. In this case, the foam-forming reaction of the raw material is sufficiently promoted, and reduction in density of the foam is achieved.

Preferably, the foam is a flexible polyurethane foam. In this case, the flexibility and elasticity of the foam is improved.

The method for producing the foam according to the present embodiment easily produces the foam exhibiting low combustibility, particularly low combustibility after heat aging and hygrothermal aging and whose discoloration is suppressed.

The present embodiment may be modified as follows.

The foam raw material may contain, for example, an antioxidant or an ultraviolet absorber so as to suppress discoloration of the foam by oxidation or ultraviolet radiation.

The inorganic compound hydrate may be contained alone in the raw material, or as the inorganic compound hydrate, a combination of a plurality of hydrates, for example, a calcium sulfate hydrate and a magnesium sulfate hydrate may be contained in the raw material. In the case in which a plurality of hydrates contained in the raw material, the function of the inorganic compound hydrate is demonstrated in a wider temperature range, and the exothermic temperature of the reaction mixture at the time of reaction and foaming of the raw material is effectively reduced.

The foam raw material may contain polyether polyol having a mass average molecular weight of from 1,000 to 2,000 as the polyether polyol.

The foam may be used for vehicle parts other than a hood silencer and a dash silencer, for example, for a floor silencer and an engine undercover silencer.

The above described embodiment will now be further specifically described below with reference to Examples and Comparative Examples. However, the present invention is not limited to these examples.

EXAMPLES 1 to 13 AND COMPARATIVE EXAMPLES 1 to 3

A foam raw material having a composition shown in Tables 1 and 2 was prepared and poured into a foaming container of 500 mm in length, width, and depth, respectively. Then, after the raw material was foamed at ordinary temperature and atmospheric pressure, the foamed raw material was passed through a heating furnace to cure (crosslink) it, thereby obtaining a flexible slab foam. The flexible slab foam obtained was cut to produce a sheet-shaped foam. In Comparative Examples 1 and 2, the raw material did not contain expanded graphite as a flame retardant, but contained only a phosphorus-based flame retardant. In Comparative Example 3, the raw material did not contain the inorganic compound hydrate. The foam according to each of Examples and Comparative Examples was measured for apparent density, hardness, peak exothermic temperature, and discoloration (ΔYI value) in accordance with the following methods, and was subjected to the combustion test, the combustion test after a heat aging test, and the combustion test after a hygrothermal aging test in accordance with the following methods. The results are shown in Tables 1 and 2. In Tables 1 and 2, the meaning of abbreviation is shown below. Further, in Tables 1 and 2, the numerical values in the column showing the components in the raw material are indicated by part(s) by mass. Furthermore, the foam according to each Example was evaluated for moldability in accordance with the following methods.

GP 3000: polyether polyol in which glycerin is addition-polymerized with propylene oxide, and which has an average molecular weight of 3,000, a hydroxyl value of 56 mgKOH/g, and a number of hydroxyl groups per molecule of three;

Excenol 941: polymeric polyol in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has an average molecular weight of 5,000, a solid content of 40% by mass, a hydroxyl value of 33 mgKOH/g, and a number of hydroxyl groups per molecule of three;

POP 31/28: polymeric polyol in which 60% by mass of polyether polyol, in which glycerin is addition-polymerized with propylene oxide, is graft-polymerized with 40% by mass of a mixture of styrene and acrylonitrile having a mass ratio of styrene to acrylonitrile of 8:2, and which has an average molecular weight of 6,000, a solid content of 20% by mass, a hydroxyl value of 28 mgKOH/g, and a number of hydroxyl groups per molecule of three;

G 700: polyether polyol in which glycerin is addition-polymerized with propylene oxide, and which has an average molecular weight of 700, a hydroxyl value of 240 mgKOH/g, and a number of hydroxyl groups per molecule of three;

G 400: polyether polyol in which glycerin is addition-polymerized with propylene oxide, and which has an average molecular weight of 400, a hydroxyl value of 420 mgKOH/g, and a number of hydroxyl groups per molecule of three;

Gypsum dihydrate: gypsum dihydrate having a specific gravity of 2.32 and an average particle diameter of 40 μm;

Magnesium sulfate heptahydrate: magnesium sulfate heptahydrate having a specific gravity of 1.68 and an average particle diameter of 20 μm;

Magnesium phosphate octahydrate: magnesium phosphate octahydrate having a specific gravity of 1.68 and an average particle diameter of 40 μm;

Dimethylethanolamine: tertiary amine;

Organometallic compound MRH-110: tin octylate manufactured by Johoku Chemical Co., Ltd.;

Foam stabilizer F650: a silicone foam stabilizer manufactured by Shin-Etsu Chemical Co., Ltd.;

Expanded graphite: SYZR502 available from Sanyo Trading Co., Ltd., which has an average particle diameter of 300 μm, expansion starting temperature of 200° C., and an expansion volume of 180 to 200 ml/g;

Flame retardant CR 504: oxydi-2,1-ethanediyl tetrakis (2-chloro-1-methylethyl) phosphate manufactured by Daihachi Chemical Industry Co., Ltd.; and Polyisocyanate T-65: tolylene diisocyanate manufactured by Nippon Polyurethane Industry Co., Ltd. (a mixture of 65% by mass of 2,4-tolylene diisocyanate and 35% by mass of 2,6-tolylene diisocyanate).

(Measuring Method)

Apparent density (kg/m$^3$): A foam in each of Examples and Comparative examples was measured for the apparent density according to JIS K 7222: 1999.

Hardness (kPa): A sample of 150 mm long, 100 mm wide, and 50 mm high, which was made from a foam in each of Examples and Comparative examples, was measured for the compressive stress when compressed by 25% according to JIS K 6400-2: 2004.

Maximum temperature (° C.): A thermocouple was inserted into the central part of a foaming container, and the raw material in each of Examples and Comparative examples was measured for the maximum temperature during the reaction and foaming of the raw material.

Discoloration (ΔYI value): A part (central part) of a foam that showed a high temperature and a part (side surface part) of the foam that showed a low temperature, during the reaction and foaming of the raw material in each of Examples and Comparative Examples, were measured for the yellowing degree (whiteness degree) with a color-difference meter [SM color computer SM-4 made by Suga Test Instruments Co., Ltd.], and discoloration was shown by the color difference (ΔYI value) of these values.

Combustion test: The combustion test of a foam in each Examples and Comparative examples was conducted by the horizontal combustion test according to the Federal Motor Vehicle Safety Standards (FMVSS 302).

Combustion test after hygrothermal aging test: The above-described combustion test was conducted after conducting a hygrothermal aging test under a condition of a temperature of 70° C. and a humidity of 95% for 500 hours.

Combustion test after heat aging test: The above-described combustion test was conducted after conducting a heat aging test under a condition of a temperature of 110° C. for 1,000 hours.

Moldability: A foam in each Example and Comparative example having a thickness of 15 mm was set in a hot press machine, which was preset at a temperature of the hot platen of 200° C., and compressed to 7.5 mm in thickness (a compressibility of 50%) in a press time of 30 minutes, and the moldability of the foam was determined visually.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| GP3000 | 30 | 30 | 30 | 30 | 30 | 30 | 30 | 30 | 30 | 100 | 50 | — | 50 |
| Excenol 941 | 50 | 50 | 50 | 50 | 50 | — | 50 | 50 | 50 | — | 50 | 100 | — |
| POP31/28 | — | — | — | — | — | 50 | — | — | — | — | — | — | — |
| G-700 | 20 | 20 | 20 | 20 | 20 | 20 | — | 20 | 20 | — | — | — | 50 |
| G-400 | — | — | — | — | — | — | 20 | — | — | — | — | — | — |
| Glycerin | 5 | 5 | 5 | 5 | 5 | 5 | 5 | 5 | 5 | — | — | — | — |

TABLE 1-continued

|  | Examples | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Gypsum dihydrate | 30 | 30 | 30 | 10 | 50 | 30 | 30 | — | — | 30 | 30 | 30 | 30 |
| Magnesium sulfate heptahydrate | — | — | — | — | — | — | — | 30 | — | — | — | — | — |
| Magnesium phosphate octahydrate | — | — | — | — | — | — | — | — | 30 | — | — | — | — |
| Water | 10 | 10 | 10 | 10 | 10 | 10 | 10 | 10 | 10 | 10 | 10 | 10 | 10 |
| Dimethylethanolamine | 0.3 | 0.3 | 0.3 | 0.3 | 0.3 | 0.3 | 0.3 | 0.3 | 0.3 | 0.3 | 0.3 | 0.3 | 0.3 |
| Organometallic compound MRH-110 | 0.3 | 0.3 | 0.3 | 0.3 | 0.3 | 0.3 | 0.3 | 0.3 | 0.3 | 0.3 | 0.3 | 0.3 | 0.3 |
| Foam stabilizer F-650 | 1 | 1 | 1 | 1 | 1 | 1 | 1 | 1 | 1 | 1 | 1 | 1 | 1 |
| Expanded graphite | 10 | 30 | 50 | 10 | 10 | 10 | 10 | 10 | 10 | 10 | 10 | 10 | 10 |
| Polyisocyanate T-65 | 123.6 | 123.6 | 123.6 | 123.6 | 123.6 | 123.6 | 123.6 | 123.6 | 123.6 | 123.6 | 123.6 | 123.6 | 123.6 |
| Isocyanate index | 100 | 100 | 100 | 100 | 100 | 100 | 100 | 100 | 100 | 100 | 100 | 100 | 100 |
| Apparent density (kg/m$^3$) | 16.5 | 18.2 | 19.8 | 15.2 | 19.8 | 16.7 | 16.8 | 16.5 | 16.6 | 15.6 | 15.9 | 15.8 | 16.2 |
| Hardness (kPa) | 17 | 18 | 17 | 18 | 21 | 17 | 19 | 17 | 18 | 6 | 7 | 7 | 8 |
| Peak exothermic temperature (° C.) | 146 | 144 | 141 | 163 | 125 | 143 | 146 | 155 | 143 | 147 | 150 | 148 | 144 |
| Discoloration (ΔYI value) | 0.2 | 0.5 | 0.6 | 0.3 | 0.4 | 0.5 | 0.6 | 0.4 | 0.6 | 0.8 | 0.5 | 0.5 | 0.6 |
| Combustion test | pass | pass | pass | pass | pass | pass | pass | pass | pass | pass | pass | pass | pass |
| Combustion test after heat aging test | pass | pass | pass | pass | pass | pass | pass | pass | pass | pass | pass | pass | pass |
| Combustion test after hygrothermal aging test | pass | pass | pass | pass | pass | pass | pass | pass | pass | pass | pass | pass | pass |

TABLE 2

|  | Comparative Examples | | |
| --- | --- | --- | --- |
|  | 1 | 2 | 3 |
| GP3000 | 30 | 30 | 30 |
| Excenol 941 | 50 | 50 | 50 |
| G-700 | 20 | 20 | 20 |
| Glycerin | 5 | 5 | 5 |
| Gypsum dihydrate | 30 | 30 | — |
| Water | 10 | 10 | 10 |
| Dimethylethanolamine | 0.3 | 0.3 | 0.3 |
| Organometallic compound MRH-110 | 0.3 | 0.3 | 0.3 |
| Foam stabilizer F-650 | 1 | 1 | 1 |
| Expanded graphite | — | — | 10 |
| Flame retardant CR504 | 10 | 30 | — |
| Polyisocyanate T-65 | 123.6 | 123.6 | 123.6 |
| Isocyanate index | 100 | 100 | 100 |
| Apparent density (kg/m$^3$) | 16.8 | 18.6 | 14.8 |
| Hardness (kPa) | 19 | 18 | 18 |
| Peak exothermic temperature (° C.) | 142 | 147 | 198 |
| Discoloration (ΔYI value) | 0.5 | 0.8 | 12.5 |
| Combustion test | pass | pass | pass |
| Combustion test after heat aging test | fail | fail | pass |
| Combustion test after hygrothermal aging test | fail | fail | pass |

As shown in Table 1, in Examples 1 to 13, since the foam raw materials each comprised expanded graphite and the inorganic compound hydrate, the foams obtained passed all of the combustion test, the combustion test after a hygrothermal aging test, and the combustion test after a heat aging test. Furthermore, the foam in each example showed a ΔYI of from 0.2 to 0.8 and no discoloration. The foam according to each example had an apparent density as low as 15.2 to 19.8 kg/m$^3$, and the foam maintained a hardness of from 6 to 21 kPa. In addition, the foam according to each example had favorable moldability.

On the other hand, as shown in Table 2, in Comparative Examples 1 and 2, since the raw materials did not contain expanded graphite as a flame retardant but contained only a phosphorus-based flame retardant, the foams obtained failed both of the combustion test after a hygrothermal aging test and the combustion test after a heat aging test. In Comparative Example 3, since the raw material did not contain the inorganic compound hydrate, the peak exothermic temperature of the raw material amounted to 198° C., and the ΔYI value of the foam increased to 12.5, showing significant discoloration.

The invention claimed is:

1. A method for producing a laminate for a hood silencer of a vehicle, the method comprising:
    applying an adhesive to a surface of a substrate composed of a foam, the foam being a polyurethane foam having been obtained by reacting, foaming, and curing a raw material which comprises a polyol, a polyisocyanate, a blowing agent, and a catalyst wherein the polyol comprises,
        (i) a polymeric polyol in which a polyether polyol is graft-polymerized with vinyl monomer,
        (ii) a low molecular weight polyether polyol having a mass average molecular weight of from 400 to 1,000, in which a polyhydric alcohol is addition-polymerized with an alkylene oxide, and
        (iii) a high molecular weight polyether polyol having a mass average molecular weight of from 2,000 to 4,000 in which a polyhydric alcohol is addition-polymerized with an alkylene oxide;
    laminating a cover material on the adhesive;
    heating and pressurizing the laminate with a hot press molding machine for a predetermined period of time;
    compressing and shaping the laminate into a predetermined shape; and
    demolding the laminate from the hot press molding machine.

2. A laminate for a vehicle part produced by gluing a cover material with an adhesive on a substrate composed of a polyurethane foam,
    wherein the polyurethane foam is obtained by reaction, foaming, and curing of a polyurethane-foam raw material comprising polyol, polyisocyanate, a blowing agent, and a catalyst and is for the vehicle part, wherein the polyol comprises,
        (i) a polymeric polyol in which a polyether polyol is graft-polymerized with vinyl monomer,
        (ii) a low molecular weight polyether polyol having a mass average molecular weight of from 400 to 1,000, in which a polyhydric alcohol is addition-polymerized with an alkylene oxide, and
        (iii) a high molecular weight polyether polyol having a mass average molecular weight of from 2,000 to 4,000 in which a polyhydric alcohol is addition-polymerized with an alkylene oxide, wherein the polyurethane foam has an apparent density of the foam as low as 15 to 20 kg/m$^3$, wherein the vehicle part is a hood silencer provided in the surroundings of an engine of a car or a dash silencer as a partition between an engine compartment and a passenger compartment, wherein the polyurethane-foam raw material further comprises expanded graphite and an inorganic compound hydrate, wherein the decomposition temperature of the inorganic compound hydrate is from 100 to 170° C., wherein the blowing agent is water and the content of water in the raw material is from 5 to 15 parts by mass per 100 parts by mass of the polyol, and wherein the inorganic compound hydrate decomposes upon heating and generates water by the decomposition and reduces the exothermic temperature of the reaction mixture at the time of the reaction of the raw material by the latent heat of vaporization of water produced by the dissociation thereof.

* * * * *